United States Patent
Kishan et al.

(10) Patent No.: US 9,952,903 B2
(45) Date of Patent: Apr. 24, 2018

(54) BACKGROUND TASK RESOURCE CONTROL

(71) Applicant: MICROSOFT TECHNOLOGY LICENSING, LLC, Redmond, WA (US)

(72) Inventors: Arun Kishan, Kirkland, WA (US); Hari Pulapaka, Redmond, WA (US); Alain Gefflaut, Kirkland, WA (US); Alex Bendetov, Redmond, WA (US); Pedro Miguel Sequeira de Justo Teixeira, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 14/883,391

(22) Filed: Oct. 14, 2015

(65) Prior Publication Data

US 2016/0034308 A1    Feb. 4, 2016

Related U.S. Application Data

(63) Continuation of application No. 13/355,115, filed on Jan. 20, 2012, now Pat. No. 9,164,803.

(51) Int. Cl.
*G06F 15/16* (2006.01)
*G06F 9/50* (2006.01)
*G06F 15/173* (2006.01)

(52) U.S. Cl.
CPC .......... *G06F 9/5011* (2013.01); *G06F 15/173* (2013.01); *G06F 2209/504* (2013.01); *G06F 2209/5011* (2013.01); *Y02B 60/142* (2013.01)

(58) Field of Classification Search
CPC .................. G06F 9/5011; G06F 15/173; G06F 2209/5011; G06F 2209/504; Y02B 60/142

(Continued)

(56) References Cited

U.S. PATENT DOCUMENTS 5,175,855 A    12/1992   Putnam et al.
5,177,855 A     1/1993   Shimai (Continued)

FOREIGN PATENT DOCUMENTS

CN    1233015 A    10/1999
CN    1510579 A     7/2004

OTHER PUBLICATIONS

"Second Office Action Issued in Chinese Application No. 201210317453.8", dated Dec. 31, 2014, 3 Pages.

(Continued)

*Primary Examiner* — Melvin H Pollack
(74) *Attorney, Agent, or Firm* — Workman Nydegger

(57) ABSTRACT

Among other things, one or more techniques and/or systems are provided for controlling resource access for background tasks. For example, a background task created by an application may utilize a resource (e.g., CPU cycles, bandwidth usage, etc.) by consuming resource allotment units from an application resource pool. Once the application resource pool is exhausted, the background task is generally restricted from utilizing the resource. However, the background task may also utilize global resource allotment units from a global resource pool shared by a plurality of applications to access the resource. Once the global resource pool is exhausted, unless the background task is a guaranteed background task which can consume resources regardless of resource allotment states of resource pools, the background task may be restricted from utilizing the resource until global resource allotment units within the global resource pool and/or resource allotment units within the application resource pool are replenished.

20 Claims, 10 Drawing Sheets

(58) Field of Classification Search
USPC .......................................................... 718/104
See application file for complete search history.

(56) References Cited

U.S. PATENT DOCUMENTS

| | | | |
|---|---|---|---|
| 6,205,468 B1 | 3/2001 | Diepstraten et al. | |
| 6,260,150 B1 | 7/2001 | Diepstraten et al. | |
| 6,629,139 B1 | 9/2003 | Kennedy | |
| 6,834,386 B1 | 12/2004 | Douceur et al. | |
| 7,051,098 B2 | 5/2006 | Masters et al. | |
| 7,313,688 B2 | 12/2007 | Bishop, Jr. et al. | |
| 7,334,228 B2 | 2/2008 | Clohessy et al. | |
| 7,380,218 B2 | 5/2008 | Rundell | |
| 7,421,509 B2 | 9/2008 | Lolayekar et al. | |
| 7,440,751 B2 | 10/2008 | Boros | |
| 7,640,547 B2 | 12/2009 | Neiman et al. | |
| 7,647,591 B1 | 1/2010 | Loucks | |
| 7,716,672 B2 | 5/2010 | Douceur et al. | |
| 7,720,098 B1 | 5/2010 | Allen et al. | |
| 7,765,553 B2 | 7/2010 | Douceur et al. | |
| 7,774,781 B2 | 8/2010 | Dees et al. | |
| 7,787,489 B2 | 8/2010 | Caulfield et al. | |
| 7,885,222 B2 | 2/2011 | Cole | |
| 7,904,673 B2 | 3/2011 | Riska et al. | |
| 7,945,914 B2 | 5/2011 | Hasiuk et al. | |
| 7,962,911 B2 | 6/2011 | Cheng et al. | |
| 7,970,902 B2 | 6/2011 | Rolia et al. | |
| 8,028,060 B1 | 9/2011 | Wyld et al. | |
| 8,145,785 B1 | 3/2012 | Finkelstein et al. | |
| 8,183,994 B2 | 5/2012 | Staab | |
| 8,223,655 B2 | 7/2012 | Heinz et al. | |
| 8,296,410 B1 | 10/2012 | Myhill et al. | |
| 8,316,098 B2 | 11/2012 | Luna et al. | |
| 8,346,935 B2* | 1/2013 | Mayo | G06F 9/5077 709/214 |
| 8,352,611 B2 | 1/2013 | Maddhuri et al. | |
| 8,381,221 B2* | 2/2013 | Behrendt | G06F 1/206 718/104 |
| 8,429,276 B1* | 4/2013 | Kumar | G06F 9/45533 709/226 |
| 8,448,006 B2* | 5/2013 | Floyd | G06F 1/3206 713/323 |
| 8,458,717 B1* | 6/2013 | Keagy | G06F 8/63 718/104 |
| 8,464,265 B2* | 6/2013 | Worley | G06F 9/5016 718/104 |
| 8,468,246 B2 | 6/2013 | Mays et al. | |
| 8,490,107 B2* | 7/2013 | Jalal | H04L 47/70 709/201 |
| 8,495,108 B2* | 7/2013 | Nagpal | G06F 17/30233 707/822 |
| 8,499,301 B2* | 7/2013 | Edwards | H04M 3/5237 718/104 |
| 8,516,284 B2* | 8/2013 | Chan | G06F 9/5094 713/320 |
| 8,533,403 B1 | 9/2013 | Law | |
| 8,533,503 B2* | 9/2013 | Lippett | G06F 1/3203 713/100 |
| 8,548,790 B2* | 10/2013 | Tylutki | G06F 11/3442 703/13 |
| 8,548,848 B1 | 10/2013 | Shaw et al. | |
| 8,578,394 B2 | 11/2013 | Srour et al. | |
| 8,589,554 B2* | 11/2013 | Kelkar | G06F 9/5072 709/226 |
| 8,589,557 B1* | 11/2013 | Labat | G06F 9/5061 709/226 |
| 8,589,936 B2* | 11/2013 | Murray | H04L 41/00 709/223 |
| 8,612,785 B2* | 12/2013 | Brown | G06F 1/329 713/300 |
| 8,627,328 B2* | 1/2014 | Mousseau | G06F 9/5072 706/47 |
| 8,645,750 B2 | 2/2014 | Kaneko et al. | |
| 8,645,965 B2* | 2/2014 | Zimmer | G06F 9/5077 712/13 |
| 8,650,420 B2* | 2/2014 | Kato | G06F 1/20 700/277 |
| 8,661,447 B1 | 2/2014 | Olliff et al. | |
| 8,694,996 B2* | 4/2014 | Cawlfield | G06F 9/45558 718/1 |
| 8,756,209 B2* | 6/2014 | Do | G06F 9/5011 707/705 |
| 8,775,787 B2* | 7/2014 | Axnix | G06F 9/468 709/221 |
| 8,782,671 B2* | 7/2014 | Cherkasova | G06F 9/5061 718/1 |
| 8,799,920 B2* | 8/2014 | Lubsey | G06F 9/5072 718/104 |
| 8,806,485 B2* | 8/2014 | Anderson | G06F 9/45558 718/1 |
| 8,806,486 B2 | 8/2014 | Martin et al. | |
| 8,868,746 B2* | 10/2014 | Zimmet | G06F 9/5061 709/226 |
| 8,869,154 B1 | 10/2014 | Hillyard et al. | |
| 8,887,166 B2* | 11/2014 | Gerovac | G06F 9/5083 709/216 |
| 8,898,291 B2* | 11/2014 | Boss | G06F 9/5011 709/224 |
| 8,914,511 B1 | 12/2014 | Yemini et al. | |
| 8,935,702 B2* | 1/2015 | Harris | G06F 9/5072 709/226 |
| 8,966,652 B2* | 2/2015 | Brown | G06F 8/60 726/26 |
| 8,996,890 B2* | 3/2015 | Cox | G06F 1/3203 713/300 |
| 8,997,171 B2 | 3/2015 | Srour et al. | |
| 9,058,211 B2* | 6/2015 | Joanny | G06F 9/5011 |
| 9,081,613 B2* | 7/2015 | Bieswanger | G06F 8/65 |
| 9,088,989 B2* | 7/2015 | Smith | H04W 72/0493 |
| 9,128,883 B2* | 9/2015 | Gokhale | G06F 9/5011 |
| 9,164,803 B2 | 10/2015 | Kishan et al. | |
| 9,250,944 B2* | 2/2016 | Anderson | G06F 9/45558 |
| 9,361,136 B2 | 6/2016 | Schwartz et al. | |
| 2002/0111962 A1 | 8/2002 | Crucs | |
| 2003/0061260 A1 | 3/2003 | Rajkumar | |
| 2003/0084087 A1 | 5/2003 | Berry | |
| 2004/0054770 A1 | 3/2004 | Touboul | |
| 2005/0026654 A1 | 2/2005 | Perez et al. | |
| 2005/0132375 A1 | 6/2005 | Douceur et al. | |
| 2005/0149932 A1 | 7/2005 | Hasink et al. | |
| 2005/0177832 A1 | 8/2005 | Chew | |
| 2006/0106928 A1 | 5/2006 | Westendorf et al. | |
| 2006/0130067 A1 | 6/2006 | Grabamik et al. | |
| 2006/0174246 A1 | 8/2006 | Tamura et al. | |
| 2006/0277391 A1 | 12/2006 | Bittner, Jr. | |
| 2007/0004468 A1 | 1/2007 | Boros | |
| 2007/0006202 A1 | 1/2007 | Mikkelsen et al. | |
| 2007/0101279 A1 | 5/2007 | Chaudhri et al. | |
| 2007/0248036 A1 | 10/2007 | Nevalainen | |
| 2007/0255798 A1 | 11/2007 | Schneider | |
| 2008/0049714 A1 | 2/2008 | Commarford et al. | |
| 2008/0160958 A1 | 7/2008 | Abichandani et al. | |
| 2008/0189708 A1 | 8/2008 | Cheng et al. | |
| 2008/0310639 A1 | 12/2008 | Kanda et al. | |
| 2008/0313639 A1 | 12/2008 | Kumar et al. | |
| 2009/0037430 A1 | 2/2009 | Mukkamala et al. | |
| 2009/0182608 A1 | 7/2009 | Tran et al. | |
| 2009/0317796 A1 | 12/2009 | Lin et al. | |
| 2010/0042400 A1 | 2/2010 | Block et al. | |
| 2010/0112955 A1 | 5/2010 | Krishnaswamy et al. | |
| 2010/0115193 A1 | 5/2010 | Manus et al. | |
| 2010/0115525 A1 | 5/2010 | Loucks | |
| 2010/0185396 A1 | 7/2010 | Docherty et al. | |
| 2010/0185758 A1 | 7/2010 | Hoga et al. | |
| 2010/0185768 A1 | 7/2010 | Hamedany et al. | |
| 2010/0199063 A1 | 8/2010 | Sechrest et al. | |
| 2010/0302002 A1 | 12/2010 | Guo et al. | |
| 2010/0312776 A1 | 12/2010 | Burrichter et al. | |
| 2011/0173525 A1 | 7/2011 | Mukhopadhyay et al. | |
| 2011/0185396 A1 | 7/2011 | Ohta et al. | |
| 2011/0239156 A1 | 9/2011 | Lin | |

(56) References Cited

U.S. PATENT DOCUMENTS

| | | |
|---|---|---|
| 2011/0249668 A1 | 10/2011 | Van Milligan et al. |
| 2011/0252430 A1 | 10/2011 | Chapman et al. |
| 2011/0292454 A1 | 12/2011 | Karmakar et al. |
| 2011/0296418 A1 | 12/2011 | Kim et al. |
| 2011/0314151 A1 | 12/2011 | Wyld et al. |
| 2012/0054752 A1 | 3/2012 | Chin |
| 2012/0079016 A1 | 3/2012 | Hung et al. |
| 2012/0081207 A1 | 4/2012 | Toprani et al. |
| 2012/0096287 A1 | 4/2012 | Kamath et al. |
| 2012/0185532 A1 | 7/2012 | Kristiansson et al. |
| 2012/0260118 A1 | 10/2012 | Jiang et al. |
| 2012/0324467 A1 | 12/2012 | Limoratto et al. |
| 2013/0024812 A1 | 1/2013 | Reeves et al. |
| 2013/0047198 A1 | 2/2013 | Srour et al. |
| 2013/0067438 A1 | 3/2013 | Bates |
| 2013/0067494 A1 | 3/2013 | Srour et al. |
| 2013/0086365 A1 | 4/2013 | Gschwind et al. |
| 2013/0110773 A1 | 5/2013 | Burger et al. |
| 2014/0047333 A1 | 2/2014 | Braun et al. |
| 2014/0123151 A1 | 5/2014 | Kishan et al. |
| 2015/0220368 A1* | 8/2015 | Edholm .............. G06F 9/45558 718/104 |

OTHER PUBLICATIONS

Corrected Notice of Allowability Issued in U.S. Appl. No. 13/224,168, dated Apr. 8, 2015, 3 Pages.
"Notice of Allowance Issued in Chinese Patent Application No. 201210320583.7", dated Jan. 25, 2016, 4 Pages.
"Office Action Issued in Chinese Patent Application No. 201210320583.7", dated Sep. 29, 2015, 3 Pages. (W/o English Translation).
Office Action dated Jun. 2, 2017 cited in U.S. Appl. No. 15/167,847.
"Background Applications", Retrieved at: <<http://read.pudn.com/downloads100/ebook/410482/brew_background_apps.pdf>>, Jun. 17, 2011, 2 Pages.
Compute Cycles: Adventures in Computing with Condor, Hadoop, SGE and the Cloud, Retrieved at: <<http://blog.cyclecomputing.com/condor/>>, Retrieved Date: Oct. 24, 2011, 32 Pages.
"Description of Performance Options in Windows", Retrieved at: <<http://support.microsoft.com/kb/259025>>, Feb. 28, 2007, 1 Page.
"Improving Power Efficiency for Applications", Retrieved at: <<http://blogs.msdn.com/b/b8/archive/2012/02/07/improving-power-efficiency-for-applications.aspx>>, Feb. 7, 2012, 49 Pages.
"Introduction to Background Tasks", Retrieved at: <<http://download.microsoft.com/download/B/D/0/BD08229A-9DF6-4841-AC9B-92F99043EFE6/Introduction_to_Background_Tasks_BUILD.docx>>, Sep. 13, 2011, 16 Pages.
"Multimedia Class Scheduler Service", Retrieved at: <<http://msdn.microsoft.com/en-us/library/windows/desktop/ms684247(v=vs.85).aspx>>, Retrieved Date: Oct. 24, 2011, 3 Pages.
"Scheduling", Retrieved at: <<http://soolly.springnote.com/pages/2222862.xhtml>>, Retrieved Date: Oct. 24, 2011, 11 Pages.
"EP Communication Issued in European Application No. 11871761.0", Filing Date: Apr. 29, 2015, 1 Page.
"Extended European Search Report Issued in European Application 11871761.0", dated Apr. 10, 2015, 5 Pages.
"Final Office Action Issued in U.S. Appl. No. 13/224,154", dated Apr. 16, 2014, 6 Pages.
"Non-Final Office Action Issued in U.S. Appl. No. 13/224,154", dated Jul. 3, 2013, 8 Pages.
"Reply to Final Office Action Filed in U.S. Appl. No. 13/224,154", Filing Date: Oct. 9, 2014, 5 Pages.
"Reply to Non-Final Office Action Filed in U.S. Appl. No. 13/224,154", Filing Date: Jan. 3, 2014, 15 Pages.
"Reply to Restriction Requirement Filed in U.S. Appl. No. 13/224,154", Filing Date: Apr. 23, 2013, 10 Pages.

"Restriction Requirement Issued in U.S. Appl. No. 13/224,154", dated Apr. 2, 2013, 6 Pages.
"Corrected Notice of Allowability Issued in U.S. Appl. No. 13/224,168", Filing Date: Mar. 6, 2015, 2 Pages.
"Final Office Action Issued in U.S. Appl. No. 13/224,168", dated Dec. 27, 2013, 34 Pages.
"Non-Final Office Action Issued in U.S. Appl. No. 13/224,168", dated Apr. 25, 2013, 28 Pages.
"Notice of Allowance Issued in U.S. Appl. No. 13/224,168", dated Jan. 9, 2015, 17 Pages.
"Reply to Final Office Action Filed in U.S. Appl. No. 13/224,168", Filing Date: Jun. 27, 2014, 20 Pages.
"Reply to Non-Final Office Action Filed in U.S. Appl. No. 13/224,168", Filing Date: Sep. 24, 2013, 20 Pages.
"Non-Final Office Action Issued in U.S. Appl. No. 13/355,115", dated Jan. 9, 2015, 8 Pages.
"Reply to Non-Final Office Action Filed in U.S. Appl. No. 13/664,954", Filing Date: Feb. 20, 2015, 11 Pages.
"First Office Action and Search Report Issued in Chinese Application No. 201201320583.7", dated Oct. 27, 2014, 5 Pages.
"First Office Action Issued in Chinese Application No. 201210317453.8", dated Apr. 24, 2014, 3 Pages.
"Reply to Chinese Office Action Filed in Application No. 201210317453.8", Filing Date: Sep. 17, 2014, 3 Pages.
"Reply to Second Chinese Office Action Filed in Application No. 201210317453.8", dated Feb. 23, 2015, 2 Pages.
"Reply to First Chinese Office Action Filed in Application No. 201210320583.7", Filing Date: Mar. 11, 2015, 4 Pages.
"Second Office Action Issued in Chinese Application No. 201210320583.7", dated May 13, 2015, 10 Pages.
Fry, "Software Design that gets the Most Out of New AMD Multi-core Microprocessors", Retrieved at: <<http://web.archive.org/web/20080823103837/http://developer.amd.com/documentation/articles/Pages/GetTheMostOutOfNewAMDMulti-coreMicroprocessors.aspx>>, Aug. 21, 2008, 4 Pages.
Likness, Jeremy, "Process Lifetime Management (PLM) and Managing State in Windows 8 Metro C# Applications", Retrieved at: <<http://www.wintellect.com/cs/blogs/jlikness/archive/2012/06/27/process-lifetime-management-plm-and-managing-state-in-windows-8-metro-c-applications.aspx>>, Jun. 27, 2012, 8 Pages.
Olsson, et al., "Resource Reservation and Power Management in Android", Retrieved at: <<http://www.control.lth.se/documents/2011/5875.pdf>>, Mar. 2011, 168 Pages.
"International Search Report Issued in PCT Application No. PCT/US2011/055618", dated Sep. 28, 2012, 9 Pages.
"International Search Report Issued in PCT Application No. PCT/US2011/055630", dated Sep. 27, 2012, 9 Pages.
"Notice of Allowance Issued in U.S. Appl. No. 13/224,154", dated Feb. 13, 2015, 21 Pages.
"Notice of Allowance Issued in U.S. Appl. No. 13/355,115", dated Jun. 11, 2015, 6 Pages.
"Notice of Allowance Issued in U.S. Appl. No. 13/224,154", dated Oct. 24, 2014, 5 Pages.
Non-Final Office Action cited in U.S. Appl. No. 13/355,115 dated Jan. 9, 2015, 14 pgs.
Non-Final Office Action cited in U.S. Appl. No. 13/664,954 dated Nov. 20, 2014, 14 pgs.
Chinese Office Action in Chinese Application No. 201210320583.7 dated Oct. 27, 2014, 5pgs.
Office Action dated Mar. 25, 2015 cited in U.S. Appl. No. 13/664,954.
Office Action dated Jul. 23, 2015 cited in U.S. Appl. No. 14/693,144.
Office Action dated Nov. 12, 2015 cited in U.S. Appl. No. 13/664,954.
Office Action dated Feb. 1, 2016 cited in U.S. Appl. No. 13/664,954.
Notice of Allowance dated Feb. 12, 2016 cited in U.S. Appl. No. 14/693,144.
Notice of Allowance dated Jul. 5, 2016 cited in U.S. Appl. No. 13/664,954.
U.S. Appl. No. 14/883,391, filed Jul. 28, 2017, Office Action.
"Reply to Final Office Action Filed in U.S. Appl. No. 13/224,154", Filed Date: Oct. 9, 2014, 9 Pages.

(56) References Cited

OTHER PUBLICATIONS

"Reply to Non-Final Office Action Filed in U.S. Appl. No. 13/224,154", Filed Date: Jan. 3, 2014, 13 Pages.
"Reply to Restriction/Election Requirement Filed in U.S. Appl. No. 13/224,154", Filed Date: Apr. 23, 2013, 10 Pages.
"Reply to Final Office Action Filed in U.S. Appl. No. 13/224,168", Filed Date: Jun. 27, 2014, 20 Pages.
"Reply to Non-Final Office Action Filed in U.S. Appl. No. 13/224,168", Filed Date: Sep. 24, 2013, 20 Pages.
"Reply to Non-Final Office Action Filed in U.S. Appl. No. 13/355,115", Filed Date: Apr. 9, 2015, 12 Pages.
"Reply to Non-Final Office Action Filed in U.S. Appl. No. 13/664,954", Filed Date: Feb. 20, 2015, 11 Pages.
"Reply to First Office Action Filed in Chinese Patent Application No. 201210317453.8", Filed Date: Sep. 8, 2014, 13 Pages.
"Reply to Second Office Action Filed in Chinese Patent Application No. 201210317453.8", Filed Date: Feb. 23, 2015, 9 Pages.
"Reply to First Office Action Filed in Chinese Patent Application No. 201210320583.7", Filed Date: Mar. 11, 2015, 10 Pages.

\* cited by examiner

BACKGROUND TASK RESOURCE CONTROL

CROSS-REFERENCE TO RELATED APPLICATIONS

This application is a continuation of U.S. patent application Ser. No. 13/355,115 filed on Jan. 20, 2012, entitled "BACKGROUND TASK RESOURCE CONTROL," which issued as U.S. Pat. No. 9,164,803 on Oct. 20, 2015, and which application is expressly incorporated herein by reference in its entirety.

BACKGROUND

Many computing environments may allow applications to execute background tasks to perform various tasks (e.g., an email application may execute a background task to check for new email; a phone application may execute a background task to receive incoming phone calls while a mobile phone hosting the phone application is in a suspended state; etc.). Unfortunately, background tasks may impact power consumption and battery life because the background tasks may consume resources, such as CPU processing power and/or network bandwidth. Additionally, background tasks may impact a user's experience with a foreground application (e.g., an application visible to a user and/or interacted with by the user) because resource usage by the foreground application may be interrupted by background tasks. Thus, allowing background tasks unfettered access to resources may result in reduced battery life and/or user experience. However, restricting execution of background tasks (e.g., background tasks of suspended applications) may also result in a reduced user experience because various (desired) tasks (e.g., email updates) may not be performed (e.g., when a user "awakens" a tablet device, an email application may comprise stale email information because the email application may have been restricted from executing a background task to check for new emails while the tablet device was "asleep", similarly real-time communication applications, such as VoIP, SMS, and instant messages, may miss and/or be unresponsive to real-time message events while the tablet device was "asleep").

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for controlling resource access and/or usage for background tasks are disclosed herein. A computing environment may allow an application to create a background task. For example, a background application (e.g., an application not visible to a user and/or not currently being interacted with by the user), a suspended application (e.g., an application suspended based upon power consumption considerations of a host computing device), and/or other applications may create a background task to perform one or more tasks. In one example, the application may be classified as a first class application, a second class application, and/or other classifications. A first class application (e.g., operating system applications, control panel applications, user designated applications, etc.) may be regarded as higher priority than a second class application (e.g., a third party application), and thus first class background tasks of the first class application may be provided with a higher level of service (e.g., additional resource access) than second class background tasks of the second class application.

An application resource pool (e.g., an allotment of a quota) may be associated with an application. The application resource pool may be configured to comprise resource allotment units (e.g., units representing CPU processing cycles, network bandwidth usage, etc.). The application resource pool may be initialized by assigning an initial resource allotment comprising resource allotment units to the application resource pool. A background task of the application may be allowed to utilize a resource (e.g., CPU processing power, network bandwidth, etc.) by consuming resource allotment units from the application resource pool. Upon exhaustion of the application resource pool, the background task may be restricted from utilizing the resource via the application resource pool. A replenishment event (e.g., a periodic time source or external signal) may be associated with the application resource pool. Upon raising/occurrence of the replenishment event, a replenishment resource allotment comprising resource allotment units may be assigned to the application resource pool without surpassing a maximum value of resource allotment units for the application resource pool. In one example, the replenishment event may be implemented using a replenishment timer. The replenishment timer and/or the maximum value for the application resource pool may be a function of whether the application is a first class application (e.g., shorter replenishment timer and/or larger maximum value) or a second class application (e.g., longer replenishment timer and/or smaller maximum value). The replenishment timer and/or the maximum value for the application resource pool may be adjusted based upon a battery state or particular standby battery time goal of a device hosting one or more applications, for example. It may be appreciated that a replenishment timer is merely one example of a replenishment event, and that other manners for determining when to replenish an application resource pool and/or a global resource pool are contemplated herein.

A global resource pool comprising global resource allotment units may be maintained for a plurality of applications. A background task may be allowed to consume (e.g., "steal") global resource allotment units from the global resource pool once the application resource pool becomes exhausted. That is, upon exhaustion of the application resource pool, the background task may be allowed to utilize the resource by consuming global resource allotment units from the global resource pool. In one example, the background task may be allowed to consume a number of global resource allotment units corresponding to the maximum value of resource allotment units for the application resource pool per consumption request, which may restrict the background task from unfairly over consuming (e.g., "hogging") global resource allotment units that may be shared with other applications. Other policies may be introduced to improve availability of the global resource pool to all background applications, such as reducing the allocation unit between successive attempts. Upon exhaustion of the global resource pool, the background task may be restricted from utilizing the resource via the global resource pool.

Nevertheless, where the global resource pool becomes exhausted, the background task may still be allowed to utilize a resource because the background task comprises a guaranteed background task (e.g., a phone application of a smart phone may be allowed to execute a receive phone call background task regardless of whether resource allotment units are available). It may be appreciated that in one example, a guaranteed background task may comprise a "critical" task. In one example, the guaranteed background task may be allowed to charge the global resource pool into a negative global resource allotment state. In another example, the application resource pool and/or global resource pool may be replenished for the guaranteed background task.

A global replenishment timer may be associated with the global resource pool. Upon expiration of the global replenishment timer, a global replenishment resource allotment comprising global resource allotment units may be assigned to the global resource pool without surpassing a maximum value of global resource allotment units for the global resource pool. The global replenishment timer and/or the maximum value for the global resource pool may be adjusted based upon a current functioning mode of the device (e.g., AC, DC, DC screen ON, etc.) hosting the application, for example.

It may be appreciated that the global resource pool may be implemented in a variety of ways (e.g., to selectively accommodate occasional bursts of activity). In one example, when the device is relying on battery power, the global resource pool may be replenished merely from unused allotment units. When the device is using AC power and/or is within a discrete state (e.g., an amount of power consumed by background tasks relative to system power consumption is minimal, such as below a threshold percentage), then the global resource pool may be replenished with additional resources (e.g., allotment units), which may allow for additional background task activity. When the device transitions between operation states (e.g., DC to AC, AC to DC, Screen On, Screen Off, etc.), the global resource pool may be resized based upon a current battery state of the device, for example.

In one example of implementing a global resource pool, a first class global resource pool may be maintained for first class applications (e.g., a first class background task may utilize a resource by consuming from the first class global resource pool after exhaustion of an application resource pool). In another example, a second class global resource pool may be maintained for second class applications (e.g., a second class background task may utilize a resource by consuming from the second class global resource pool after exhaustion of an application resource pool). The second class global pool may also be maintained for first class applications, such that a first class background task may utilize a resource by consuming from the second class global resource pool after exhaustion of the first class global resource pool (e.g., but a second class background task may not be allowed to consume from a first class global resource pool).

Selectively allowing and/or restricting background tasks from utilizing resources may improve power consumption, battery life, and/or user experience, while maintaining functionality provided by the background tasks.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
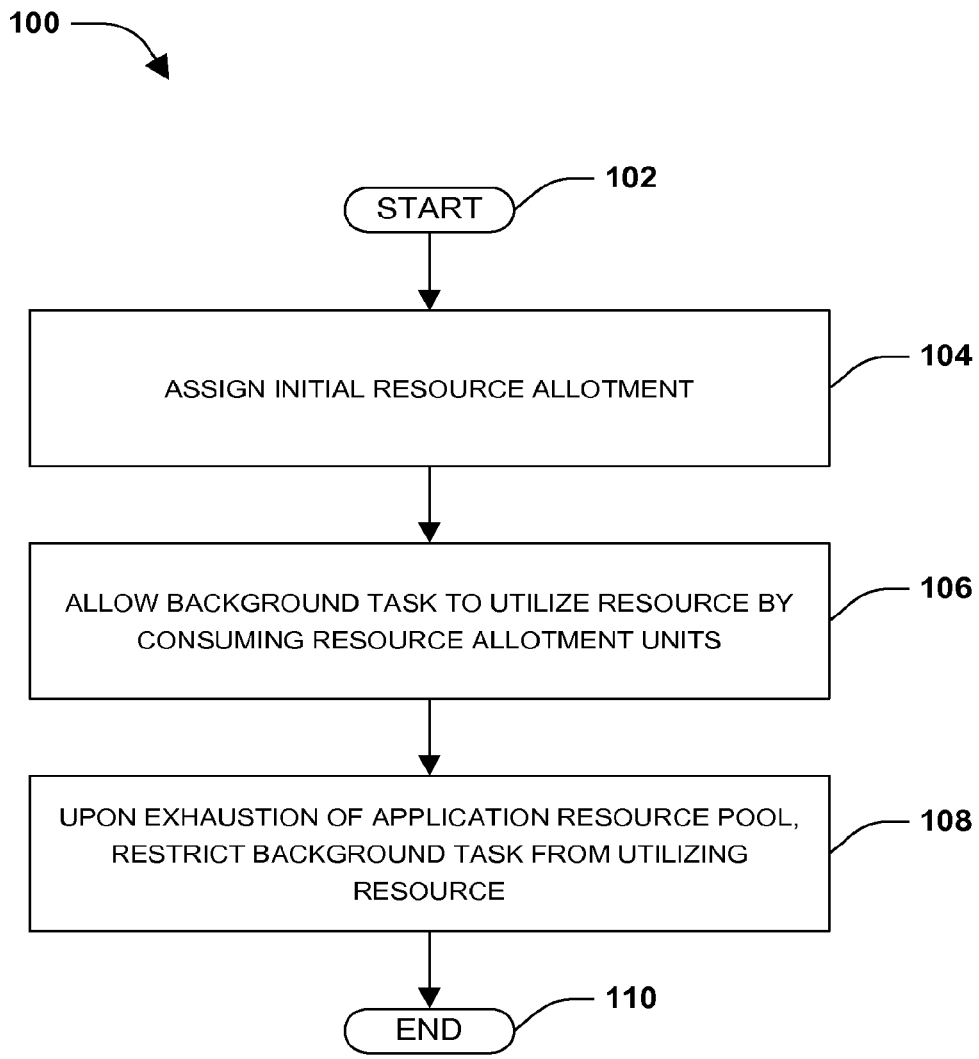
FIG. 1 is a flow chart illustrating an exemplary method of controlling resource access for background tasks.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many computing environments may implement power conservation techniques to mitigate power consumption, conserve battery life, and/or improve performance of foreground applications. In one example, an operating system may provide a suspend policy that may inhibit the execution of a suspended application that may otherwise invoke computing resources to perform power consuming tasks. In this way, the suspended application may be unable to execute background tasks. Unfortunately, suspended applications may be unable to perform desired functionality (e.g., a suspended email application may be unable to periodically check for email while suspended, which may result in the email application providing stale email information upon resumption). In another example, the operating system may lack adequate resource management policies for background applications (e.g., applications not visible to a user and/or interacted with by the user), which may allow the background applications to execute background tasks to perform power consuming tasks that may reduce battery life and/or reduce performance of foreground applications.

Accordingly, among other things, one or more systems and/or techniques for controlling resource access for background tasks are provided herein. In particular, an application resource pool configured to comprise resource allotment units (e.g., units representing CPU processing cycles, network bandwidth, etc.) may be maintained for an application. A background task of the application may utilize a resource, such as a CPU, by consuming the resource allotment units. Upon exhaustion of the application resource pool, the background task may be restricted from utilizing the resource. This can be achieved by, for example, returning the application to the suspended state. A replenishment timer may be maintained for the application resource pool, such that a replenishment resource allotment comprising resource allotment units may be assigned to the application resource pool upon expiration of the replenishment timer. A global resource pool comprising global resource allotment units may be maintained for a plurality of applications. For example, if the application resource pool is exhausted, then the background task may utilize the resource by consuming global resource allotment units from the global resource pool. Upon exhaustion of the global resource pool, the background task may be restricted from utilizing the resource. A global replenishment timer may be maintained for the global resource pool, such that a global replenishment resource allotment comprising global allotment units may be assigned to the global resource pool upon expiration of the global replenishment timer. In this way, background tasks may be selectively allowed and/or restricted from utilizing resources based upon application resource pools and/or global resource pools, which may improve power conservation, battery life, and/or foreground application execution, for example.

One embodiment of controlling resource access for background tasks is illustrated by an exemplary method 100 in FIG. 1. At 102, the method starts. A computing environment may allow an application to create background tasks to perform various tasks (e.g., an email application may create a background task to check for new emails). Instead of merely allowing or denying execution of the background tasks, resource access control may be implemented. In one example of implementing resource access control, an application resource pool for an application may be initialized and/or maintained. In particular, an initial resource allotment comprising resource allotment units may be assigned to the application resource pool associated with the application, at 104. For example, an initial resource allotment of 2 seconds (e.g., representing 2 seconds of CPU processing cycles) may be assigned to an application resource pool associated with an email application. At 106, a background task of the application may be allowed to utilize a resource by consuming resource allotment units from the application resource pool. For example, the email application may create an email update background task that may consume CPU processing cycles by consuming time units from the 2 seconds assigned to the application resource pool (e.g., 0.03 seconds of processing cycles may be utilized when the email update background task initially checks for new emails, thus leaving 1.97 seconds remaining within the application resource pool after the initial check).

At 108, upon exhaustion of the application resource pool (e.g., 0 seconds remaining), the background task may be restricted from utilizing the resource via the application resource pool. In this way, the background task may be restricted from over consuming resources via the application resource pool until replenishment of the application resource pool, which may reduce power consumption and/or improve foreground application performance by freeing up resources.

A replenishment timer may be maintained for the application resource pool (e.g., a 15 minute timer). Upon expiration of the replenishment timer, a replenishment resource allotment comprising resource allotment units (e.g., 2 seconds) may be assigned to the application resource pool (e.g., the application resource pool may be replenished to 2 seconds). In one example, the application resource pool may be limited by a maximum value of resource allotment units, such that the replenishment resource allotment may not replenish the application resource pool above the maximum value (e.g., if the replenishment timer has expired but the application resource pool is not yet empty and instead still comprises 1.5 seconds, then the replenishment resource allotment may merely assign 0.5 seconds even though 2 seconds are available for the replenishment resource allotment to assign). If a surplus of resource allotment units results from replenishment of the application resource pool, then the surplus of resource allotment units may be assigned to a global resource pool associated with a plurality of applications (e.g., if the application resource pool comprises 1.5 seconds, then the replenishment resource allotment may assign 0.5 seconds, which may result in a surplus of 1.5 seconds that may be assigned to a global resource pool). In one example, the replenishment timer may be adjusted based upon a battery state of a device within which the background task is executing (e.g., the replenishment timer may be lengthened as the amount of battery charge diminishes so that the application resource pool is replenished less frequently, the replenishment timer may be shortened when the device is connected to AC power so that the application resource pool is replenished more frequently, etc.). Similarly, the maximum value of resource allotment units may be based upon a battery state of the device (e.g., the maximum value may be decreased as a battery charge of the device decreases; the maximum value may be increased when the device is connected to AC power; etc.).

A global resource pool comprising global resource allotment units may be maintained for a plurality of applications (e.g., 30 seconds may be initially assigned to the global resource pool). Applications may be allowed to consume (e.g., "steal") global resource allotment units from the global resource pool in order to utilize a resource. In one example, upon exhaustion of the application resource pool (e.g., 0 seconds remaining), the background task may be allowed to access the resource (e.g., one or more resources) by consuming global resource allotment units from the global resource pool. The background task may be allowed to consume, per consumption request, a number of global resource allotment units corresponding to the maximum value of resource allotment units for the application resource pool. For example, the email update background task may be allowed to consume (e.g., "steal") global resource allotment units from the global resource pool in 2 second chunks based upon the application resource pool of the email application comprising the maximum value of 2 seconds.

Upon exhaustion of the global resource pool (e.g., 0 seconds remaining), the background task may be restricted from utilizing the resource (e.g., one or more resources) via the global resource pool. In one example, if the background application comprises a guaranteed background task (e.g., a background task guaranteed to execute), then the background task may utilize the resource by charging the global resource pool into a negative global resource allotment state at least one time (e.g., subsequent requests may be denied to conserve battery). For example, the email update background task may charge the exhausted global resource pool for 1.5 seconds, thus placing the global resource pool into a negative 1.5 global resource allotment state. In one example, the negative global resource allotment state may be held against the global resource pool during a subsequent replenishment. For example, a global replenishment resource allotment of 30 seconds may merely place the global resource pool at 28.5 seconds. As another example, unused quota from applications (e.g., application resource pools) can be used to reduce the "debt" of a negative global resource pool. Thus, while the ability to service guaranteed tasks with the minimum unit of quota is honored, non-critical tasks cannot use the global resource pool until the "borrowed" amount has been returned.

A global replenishment timer may be maintained for the global resource pool (e.g., a 40 minute timer). Upon expiration of the global replenishment timer, a global replenishment resource allotment comprising global resource allotment units may be assigned to the global resource pool (e.g., the global resource pool may be replenished with 30 seconds). In one example, the global resource pool may be limited by a maximum value of global resource allotment units, such that the global replenishment resource allotment may not replenish the global resource pool above the maximum value (e.g., if the global replenishment timer has expired but the global resource pool is not yet empty and instead still comprises 10 seconds, then the global replenishment resource allotment may merely assign 20 seconds even though 30 seconds are available for the global replenishment resource allotment). In one example, the maximum value of global resource allotment units for the global resource pool may be adjusted based upon a battery state of the device within which the background task is executing (e.g., the maximum value may be decreased as a battery charge of the device decreases; the maximum value may be increased when the device is connected to AC power; etc.). The global replenishment timer may be adjusted based upon the battery state of the device (e.g., the global replenishment timer may be lengthened as the battery charge of the device decreases; the global replenishment timer may be shortened when the device is connected to AC power; etc.). In another example, the refill rate may be modified based on the state of the device. For example, on DC, there may be no automatic refill rate other than unused quota from applications. On AC however, where the marginal power draw of background tasks compared to the battery refill and/or screen rate is low, this refill rate may be increased significantly. The global resource pool size can be rescaled to reflect actual battery capacity any time the operating mode of the system, and/or refill rate of the pool, changes.

Applications may be classified, and may be provided various levels of service (e.g., varying levels of resource access) based upon such classifications. For example, particular applications may be classified as first class applications (e.g., operating system applications, control panel applications, user designated applications, etc.), while other applications may be classified as second class applications (e.g., third party applications, non-system applications, user designated applications, etc.). It may be appreciated that various classification schemes may be utilized, and are not limited to merely first class and second class classification. In one example of providing varying level of service, the replenishment timer may be adjusted based upon whether the application is a first class application or a second class application (e.g., a replenishment timer may be shortened for a first class application so that the application resource pool is replenished more frequently, and may be lengthened for a second class application). In another example of providing varying level of service, the maximum value of resource allotment units for the application resource pool may be a function of whether the application is a first class application or a second class application (e.g., an application resource pool for a first class application may have a larger maximum value than an application resource pool for a second class application).

In another example of providing varying level of service, multiple global resource pools may be maintained based upon various classifications. For example, a first class global resource pool associated with plurality of first class applications and a second class global resource pool associated with a plurality of second class applications may be maintained. First class applications may be allowed to consume from the first class global resource pool and/or may be allowed to consume from the second class global resource pool. For example, upon a first class background task of a first class application exhausting a first class application resource pool, the first class background task may be allowed to utilize a resource by consuming (e.g., "stealing") global resource allotment units from the first class global resource pool. Upon the first class background task exhausting the first class global resource pool, the first class background task may be allowed to utilize the resource by consuming (e.g., "stealing") global resource allotments units from the second class global resource pool.

Second class applications may be allowed to access the second class global resource pool, but may be restricted from accessing the first class global resource pool. For example, upon a second class background task of a second class application exhausting a second class application resource pool, the second class background task may be allowed to utilize a resource by consuming (e.g., "stealing") global resource allotment units from the second class global resource pool. However, upon exhaustion of the second class global resource pool, the second class background task may be restricted from utilizing the resource (e.g., and may be restricted from "stealing" from the first class global resource pool).

The first class global resource pool and the second class global resource pool may have similar or different configurations. In one example of differing configurations, the first class global resource pool may be assigned a first maximum value of global resource allotment units greater than a second maximum value of global resource allotment units for the second class global resource pool. In another example, a first class replenishment timer of the first class global resource pool may comprise a first replenishment time span smaller than a second replenishment time span of a second class replenishment timer of the second class global resource pool (e.g., the first class global resource pool may be replenished more frequently than the second class global resource pool).

In one example, the application may be in a suspended state (e.g., due to the application being in a background state not visible to a user; due to the device being placed into low power consumption state; etc.). Accordingly, resource access for background tasks of the application may be controlled (e.g., utilizing the application resource pool, global resource pool, etc.). If the application transitions from the suspended state to an execution state (e.g., the user brings the application into the foreground), background tasks of the application may be unrestricted from accessing resources. In this way, the user may interact with the application without undue hindrance because the application may be allowed unrestricted access to resources. A state of the application resource pool may be saved when the application transitions into the execution state so that the application resource pool may be restored to the prior state when the application transitions back into the suspended state. It may be appreciated that foreground tasks (e.g., application in an active execution state, such that tasks are in the foreground and visible) are generally not tightly coupled with background tasks. Tasks can generally complete more quickly (e.g., such as receive emails) when an application is in an active execution state, which is consistent with expectations of a user actively using the application. Also, due to refill rate modulation, if a user is actively using the device, tasks will complete more quickly in a screen on state, even if the user switches to a different application. At 110, the method ends.

Figure 2:
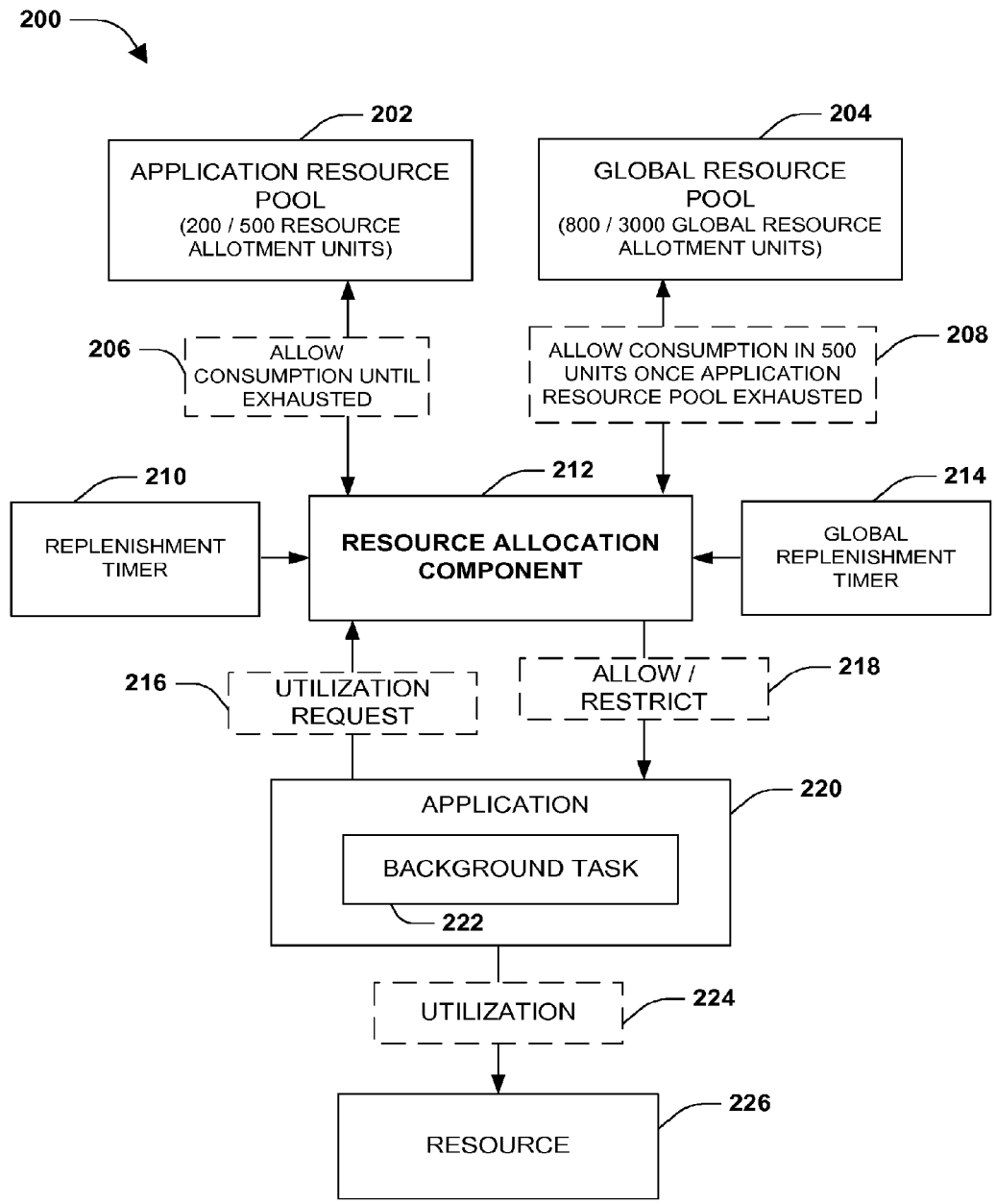
FIG. 2 is a component block diagram illustrating an exemplary system for controlling resource access for background tasks.

FIG. 2 illustrates an example of a system 200 configured for controlling resource access for background tasks. The system 200 may comprise a resource allocation component 212. The resource allocation component 212 may maintain an application resource pool 202 associated with an application 220 and/or may maintain a global resource pool 204 associated with a plurality of applications. For example, the resource allocation component 212 may initialize the application resource pool 202 by assigning an initial resource allotment comprising resource allotment units to the application resource pool 202 (e.g., 500 resource allotment units may be assigned). Similarly, the resource allocation component 212 may assign global resource allotment units to the global resource pool 204 (e.g., 3000 global resource allotment units may be assigned).

The resource allocation component 212 may be configured to allow (e.g., allow/restrict 218) a background task 222 of the application 220 to utilize 224 a resource 226 by consuming 206 resource allotment units from the application resource pool 202 (e.g., based upon a utilization request 216 from the background task 222). Upon exhaustion of the application resource pool 202, the resource allocation component 212 may restrict (e.g., allow/restrict 218) the background task 22 from utilizing 224 the resource 226 via the application resource pool 202. However, in one example, the resource allocation component 212 may allow (e.g., allow/restrict 218) the background task 222 to utilize 224 the resource 226 by consuming 208 global resource allotment units from the global resource pool 204 once the application resource pool 202 is exhausted (e.g., the background task 222 may be allowed to consume 208 500 global resource units per consumption based upon the application resource pool 202 having a maximum value of 500 resource allotment units). In another example, the resource allocation component 212 may transfer global resource allotment units from the global resource pool 204 to the application resource pool 202 as resource allotment units. Upon exhaustion of the global resource pool 204, the resource allocation component 212 may restrict (e.g., allow/restrict 218) the background task 222 from utilizing 224 the resource 226 unless the background task 222 comprises a guaranteed background task. The guaranteed background task may be allowed to utilize 224 the resource 226 by charging the global resource pool 204 into a negative global resource allotment state (e.g., negative 500 (or more) global resource allotment units).

The resource allocation component 212 may maintain a replenishment timer 210 for the application resource pool 202. Upon expiration of the replenishment timer 210, the resource allocation component 212 may assign a replenishment resource allotment comprising resource allotment units to the application resource pool 202 without surpassing a maximum value of resource allotment units (e.g., 500 resource allotment units) for the application resource pool 202. For example, upon expiration of the replenishment timer 210 (e.g., prior to the application resource pool 202 becoming exhausted), 300 resource allotment units may be assigned to the application resource pool 202 so that the application resource pool 202 may comprise 500 resource allotment units. The surplus of 200 resource allotment units may be assigned to the global resource pool 204, for example.

The resource allocation component 212 may maintain a global replenishment timer 214 for the global resource pool 204. Upon expiration of the global replenishment timer 214, the resource allocation component 212 may assign a global replenishment resource allotment comprising global resource allotment units to the global resource pool 204 without surpassing a maximum value of resource allotment units (e.g., 3000 resource allotment units) for the global resource pool 204. For example, upon expiration of the global replenishment timer 214 (e.g., prior to the global resource pool 204 becoming exhausted), 2200 global resource allotment units may be assigned to the global resource pool 204 so that the global resource pool 204 comprises 3000 resource allotment units. The surplus of 800 global resource allotment units may be discarded, for example.

Figure 3:
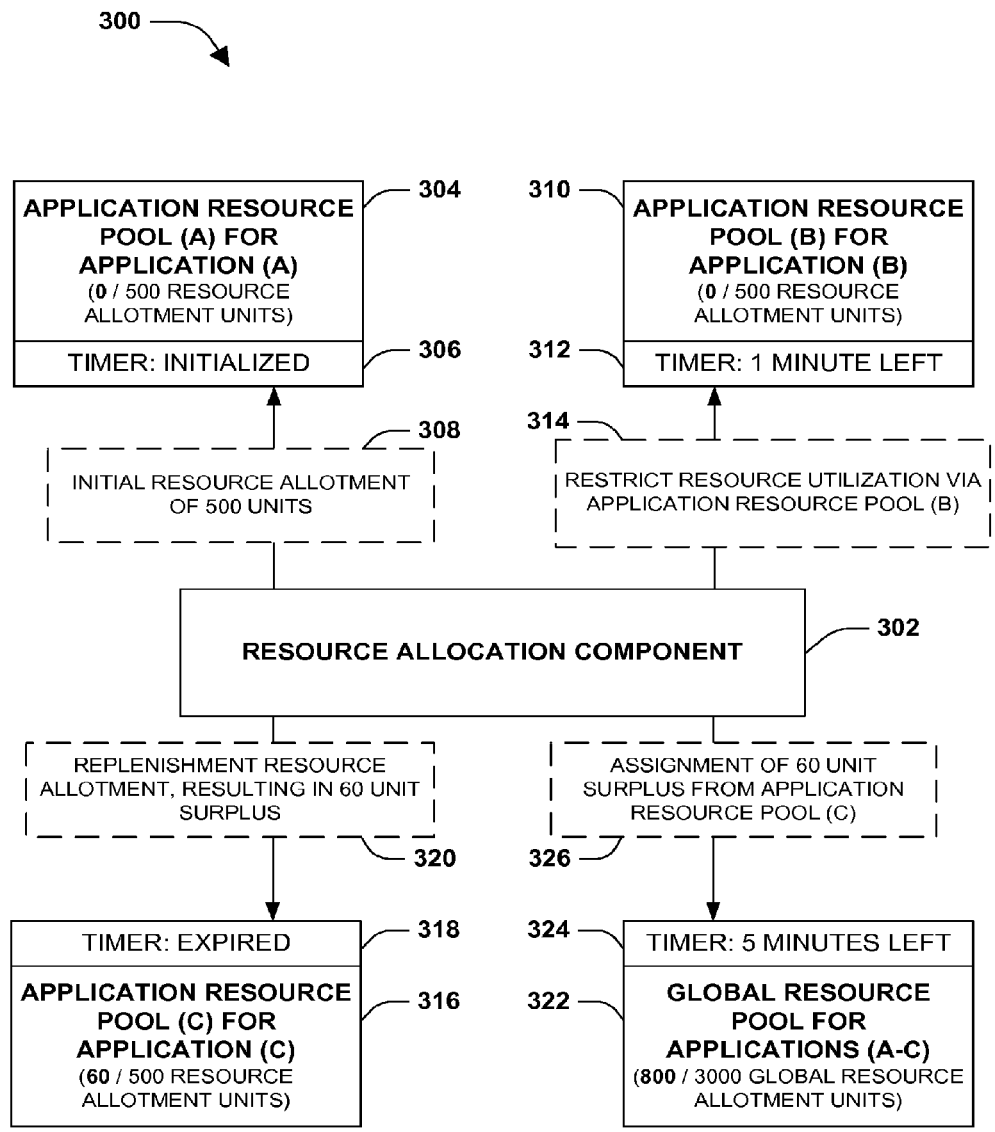
FIG. 3 is an illustration of an example of maintaining a global resource pool and one or more application resource pools.

FIG. 3 illustrates an example 300 of maintaining a global resource pool and one or more application resource pools. A resource allocation component 302 may be configured to maintain an application resource pool (A) 304 for an application (A), an application resource pool (B) 310 for an application (B), an application resource pool (C) 316 for an application (C), and/or a global resource pool 322 for applications (A), (B), and/or (C), for example.

In one example, the resource allocation component 302 may initialize the application resource pool (A) 304 for the application (A). The resource allocation component 302 may assign an initial resource allotment 308 of 500 resource allotment units to the application resource pool (A) 304. The resource allocation component 302 may initialize a replenishment timer 306 for the application resource pool (A) 304 (e.g., the replenishment timer 306 may be assigned a 3 minute timer). In this way, a background task of application (A) may utilize a resource via the application resource pool (A) 304 by consuming resource allotment units. For example, a resource allotment unit may represent a CPU processing cycle, a tenth of a second of network bandwidth, and/or other various resource units. The background task of application (A) may consume 10 resource allocation units in order to utilize 10 CPU processing cycles, a second of network bandwidth, and/or other resource units.

The resource allocation component 302 may maintain the application resource pool (B) 310 for the application (B). The application resource pool (B) 310 may be in an exhausted state because application (B) may have consumed the 500 resource allotment units assigned to the application resource pool (B) 310. Thus, a background task of application (B) may be restricted 314 from utilizing a resource via application resource pool (B) 310 because application resource pool (B) comprises 0 resource allotment units. However, the background task of application (B) may attempt to utilize the resource via the global resource pool 322. The resource allocation component 302 may replenish the application resource pool (B) 310 upon expiration of a replenishment timer 312 associated with the application resource pool (B) 310. For example, after the expiration of 1 minute, 500 resource allotment units may be assigned to the application resource pool (B) 310. In one example, leftover resource allotment units may or may not be returned into the global resource pool 322 based upon a state of a device (e.g., if using DC power, then leftover resource allotment units may be returned to the global resource pool 322 because no automatic replenishment may be implemented; if using AC power, then the global resource pool 322 may be automatically replenished, and thus the leftover resource allotment units may not be returned).

The resource allocation component 302 may maintain the application resource pool (C) 316 for the application (C). The resource allocation component 302 may replenish 320 the application resource pool (C) 316 upon expiration of a replenishment timer 318 associated with the application resource pool (C) 316. For example, 500 resource allotment units may be available to replenish 320 the application resource pool (C) 316. However, the application resource pool (C) 316 may comprise 60 resource allotment units. Thus, the replenishment of the application resource pool (C) 316 may result in a surplus of 60 resource allotment units because the application resource pool (C) 316 may be limited to a maximum value of 500 resource allocation units. In one example, the surplus may be assigned 326 to the global resource pool 322.

The resource allocation component 302 may maintain the global resource pool 322 for applications (A), (B), and/or (C). For example, background tasks of applications (A), (B), and/or (C) may utilize a resource by consuming global resource allotment units from the global resource pool 322 based upon exhaustion of corresponding application resources pools (e.g., a background task of application (B) may consume global resource allotment units from the global resource pool in (a maximum of) 500 unit chunks based upon the application resource pool (B) being in an exhausted state). A global replenishment timer 324 may be maintained for the global resource pool 322, such that the global resource pool 322 may be replenished (e.g., up to a maximum) upon expiration of the global replenishment timer 324.

Figure 4:
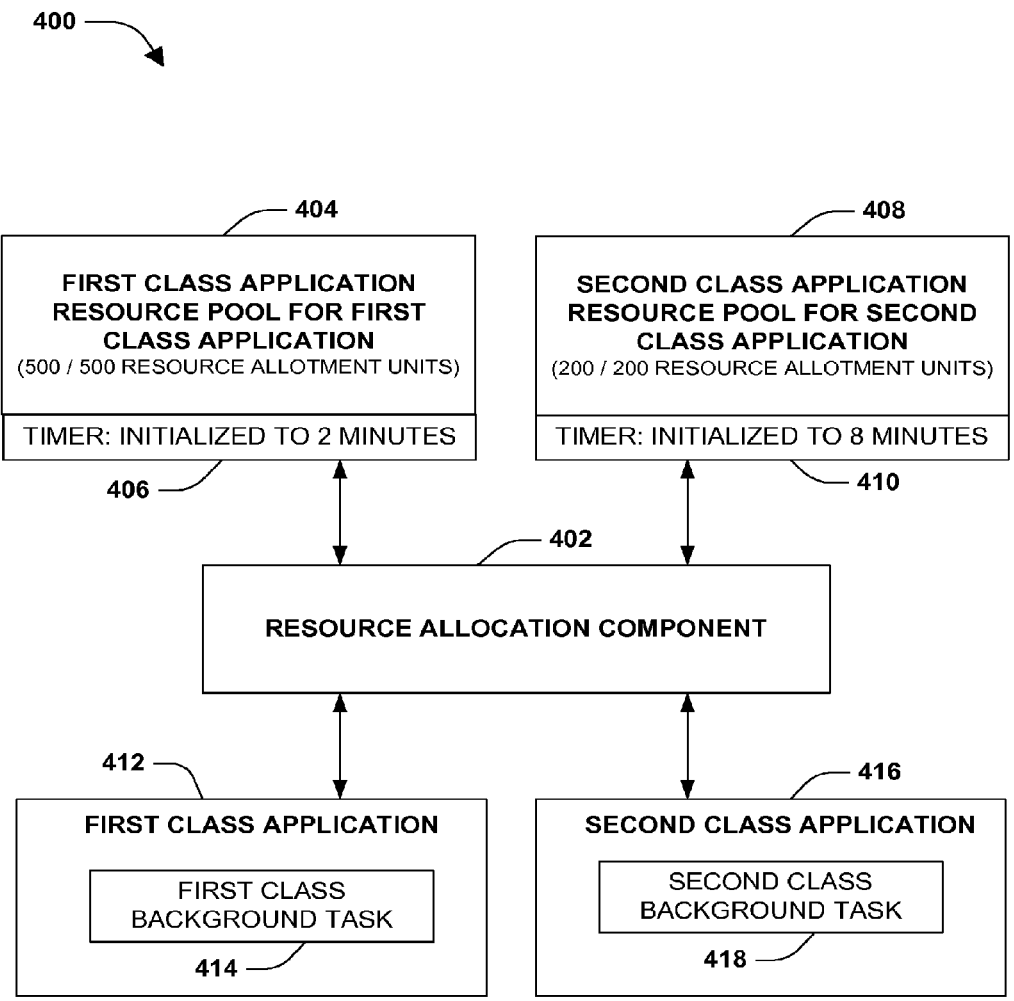
FIG. 4 is an illustration of an example of a first class application resource pool and a second class application resource pool.

FIG. 4 illustrates an example 400 of a first class application resource pool 404 and a second class application resource pool 408. A resource allocation component 402 may be configured to maintain the first class application resource pool 404 for a first class application 412. For example, a first class background task 414 of the first class application 412 may utilize a resource based upon consuming resource allotment units from the first class application resource pool 404. The resource allocation component 402 may be configured to maintain the second class application resource pool 408 for a second class application 416. For example, a second class background task 418 of the second class application 416 may utilize a resource based upon consuming resource allotment units from the second class application resource pool 408.

It may be appreciated that the resource allocation component 402 may maintain the first class application resource pool 404 and the second class application resource pool 408 similarly or differently. In one example of maintaining the application resource pools differently, the first class application resource pool 404 may be assigned a maximum value of resource allotment units (e.g., 500 resource allotment units) that is greater than a maximum value of resource allotment units assigned to the second class application resource pool 408 (e.g., 200 resource allotment units). In another example, a first class replenishment timer 406 of the first class application resource pool 404 may be assigned a replenishment time span (e.g., a 2 minute timer until replenishment) that is shorter than a replenishment time span assigned to a second class replenishment timer 410 of the second class application resource pool 408 (e.g., an 8 minute timer until replenishment). In this way, the first class background task 414 may receive a higher level of service (e.g., increased resource access based upon the larger maximum value and the shorter replenishment time span) than the second class background task 418.

Figure 5:
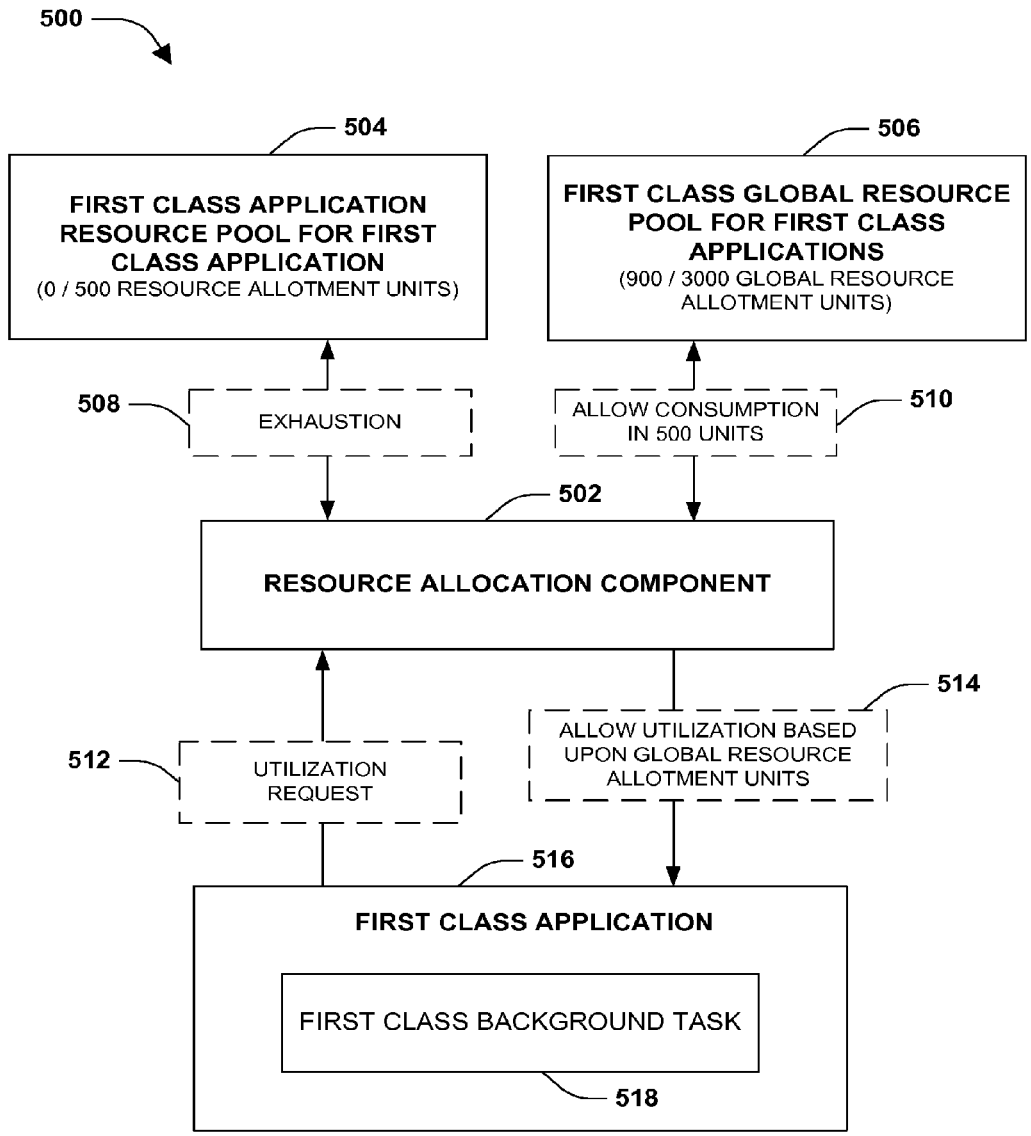
FIG. 5 is an illustration of an example of a first class background task of a first class application utilizing a resource based upon consuming global resource allotment units from a first class global resource pool.

FIG. 5 illustrates an example 500 of a first class background task 518 of a first class application 516 utilizing a resource based upon consuming global resource allotment units from a first class global resource pool 506. A resource allocation component 502 may be configured to maintain a first class application resource pool 504 for the first class application 516. The resource allocation component 502 may be configured to maintain the first class global resource pool 506 for first class applications (e.g., the first class application 516 and/or other first class applications not illustrated).

The first class background task 518 may attempt to utilize a resource (e.g., utilization request 512) by consuming resource allotment units from the first class application resource pool 504. However, the resource allocation component 502 may restrict the first class background task 518 from utilizing the resource via the first class application resource pool 504 based upon the first class application resource pool being exhausted 508. In one example, because the first class application resource pool 504 is exhausted 508, the resource allocation component 502 may allow the first class background task 518 to utilize the resource by consuming 510 global resource allotment units from the first class global resource pool 506 (e.g., allow utilization 514). The resource allocation component 502 may allow the first class background task 518 to consume 510 global resource allotment units in 500 unit chunks (e.g., based upon a maximum value of 500 resource allotment units for the first class application resource pool 504). In another example, the resource allocation component 502 may transfer global resource allotment units from the first class global resource pool 506 to the first class application resource pool 504 as resource allotment units. For example, the resource allocation component 502 may transfer 500 unit chunks.

Figure 6:
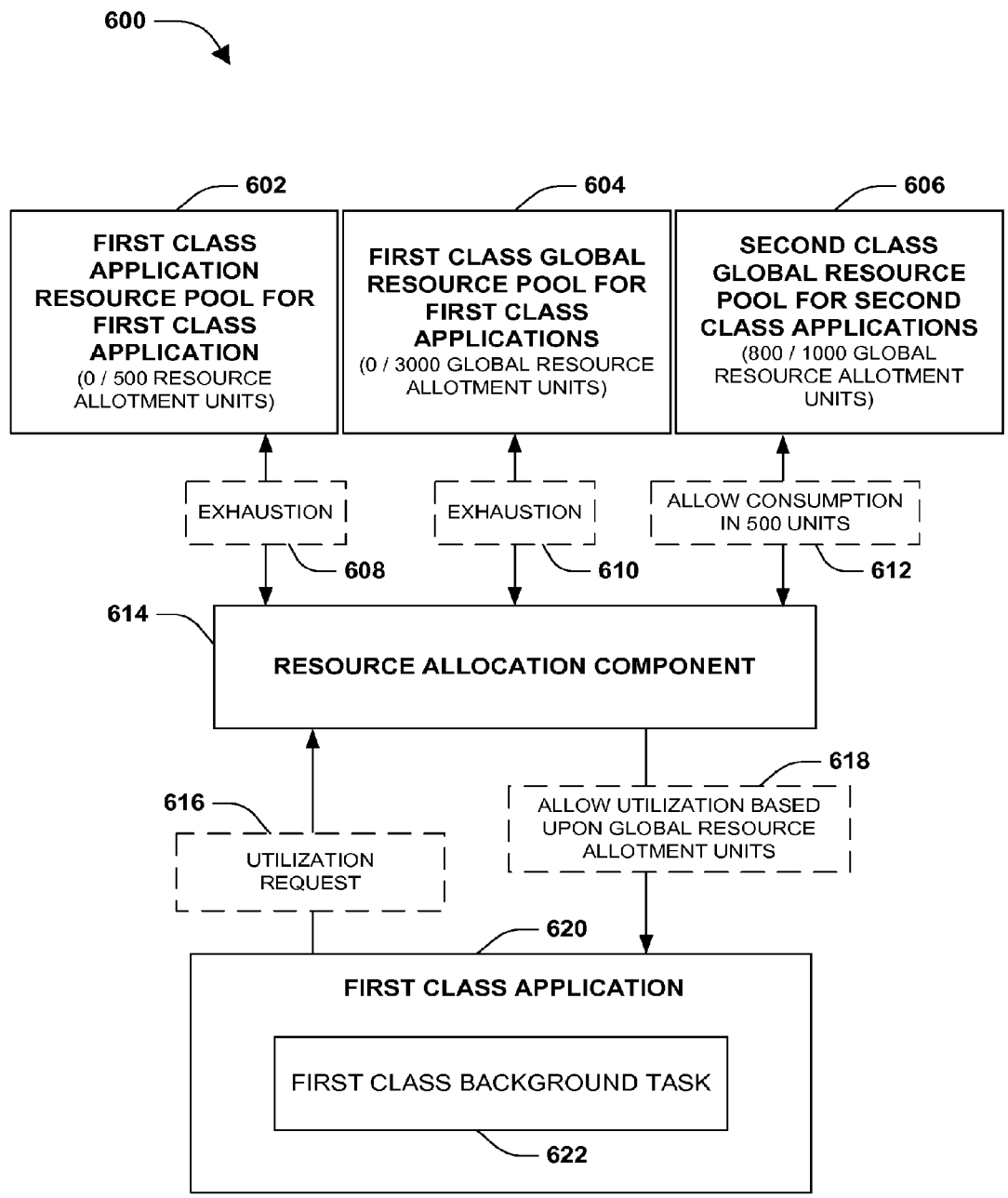
FIG. 6 is an illustration of an example of a first class background task of a first class application utilizing a resource based upon consuming global resource allotment units from a second class global resource pool.

FIG. 6 illustrates an example 600 of a first class background task 622 of a first class application 620 utilizing a resource based upon consuming global resource allotment units from a second class global resource pool 606. A resource allocation component 614 may be configured to maintain a first class application resource pool 602 for the first class application 620. The resource allocation component 614 may be configured to maintain a first class global resource pool 604 for first class applications (e.g., the first class application 620 and/or other first class applications not illustrated). The resource allocation component 614 may be configured to maintain the second class global resource pool 606 for second class applications (e.g., second class applications not illustrated).

The first class background task 622 may attempt to utilize a resource (e.g., utilization request 616) by consuming resource allotment units from the first class application resource pool 602. However, the resource allocation component 614 may restrict the first class background task 622 from utilizing the resource via the first class application resource pool 602 because the first class application resource pool 602 is exhausted 608. Because the first class application resource pool 602 is exhausted 608, the resource allocation component 614 may allow the first class background task 622 to utilize the resource by consuming global resource allotment units from the first class global resource pool 604 (e.g., if global resource allotment units are available for consumption). However, the resource allocation component

614 may restrict the first class background task 622 from utilizing the resource via the first class global resource pool 604 because the first class global resource pool 604 is exhausted 610. In one example, because the first class global resource pool 604 is exhausted 610, the resource allocation component 614 may allow the first class background task 622 to utilize the resource by consuming 612 global resource allotment units from the second class global resource pool 606 (e.g., allow utilization 618). The resource allocation component 614 may allow the first class background task 622 to consume 612 global resource allotment units in 500 unit chunks (e.g., based upon a maximum value of 500 resource allotment units for the first class application resource pool 602). In another example, the resource allocation component 614 may transfer global resource allotment units from the second class global resource pool 606 to the first class global resource pool 604, which may be further transferred from the first class global resource pool 604 to the first class application resource pool 602. For example, the resource allocation component 614 may transfer 500 unit chunks.

Figure 7:
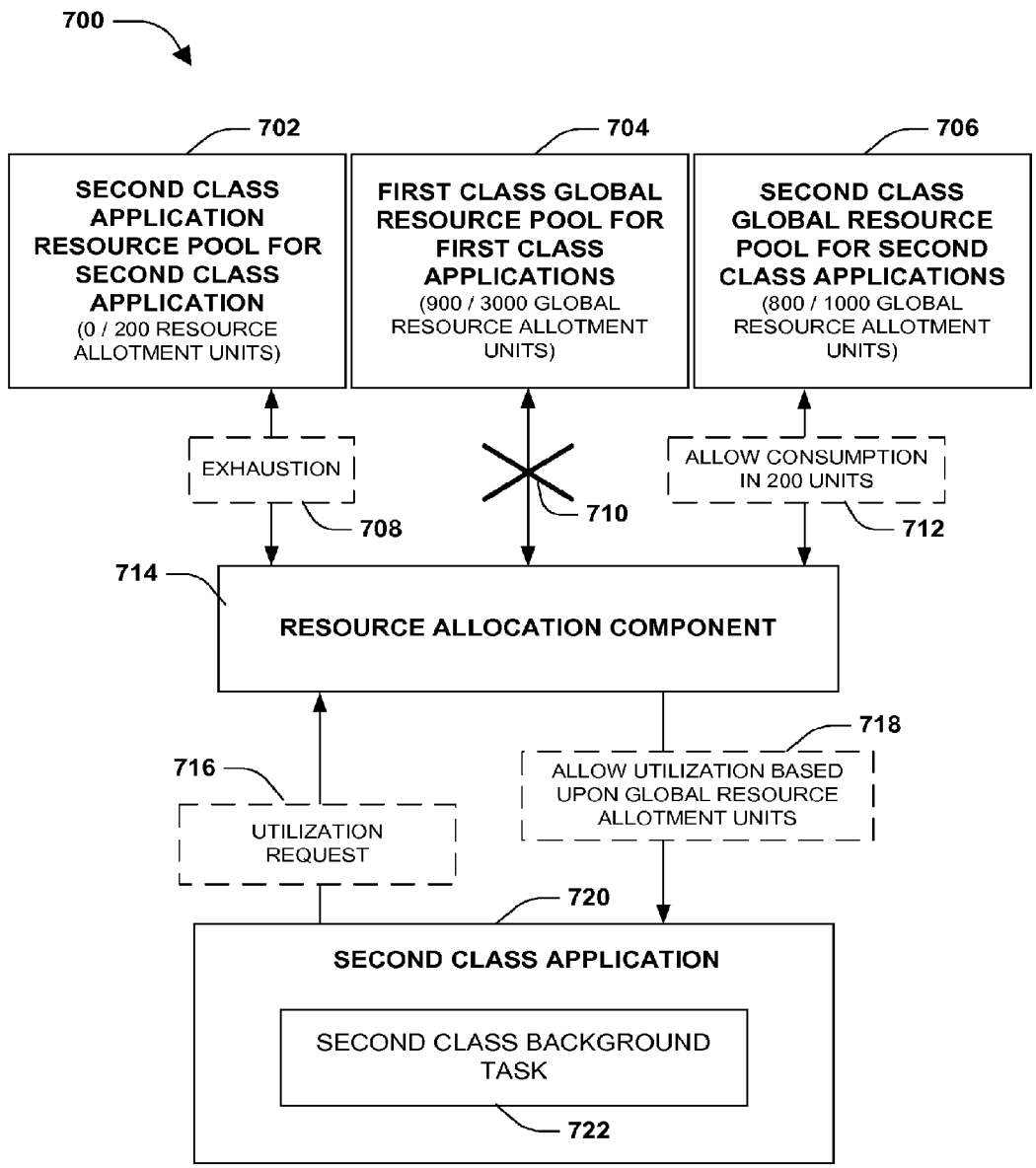
FIG. 7 is an illustration of an example of a second class background task of a second class application utilizing a resource based upon consuming global resource allotment units from a second class global resource pool.

FIG. 7 illustrates an example 700 of a second class background task 722 of a second class application 720 utilizing a resource based upon consuming global resource allotment units from a second class global resource pool 706. A resource allocation component 714 may be configured to maintain a second class application resource pool 702 for the second class application 720. The resource allocation component 714 may be configured to maintain a first class global resource pool 704 for first class applications (e.g., one or more first class applications not illustrated). The resource allocation component 714 may be configured to maintain the second class global resource pool 706 for second class applications (e.g., second class application 720 and/or other second class applications not illustrated).

The second class background task 722 may attempt to utilize a resource (e.g., utilization request 716) by consuming resource allotment units from the second class application resource pool 702. However, the resource allocation component 714 may restrict the second class background task 722 from utilizing the resource via the second class application resource pool 702 because the second class application resource pool 702 is exhausted 708. In one example, the second class background task 722 may be restricted 710 from consuming global resource allotment units from the first class global resource pool 704 because the second class background task 722 is not a first class background task. Because the second class application resource pool 702 is exhausted 708, the resource allocation component 714 may allow the second class background task 722 to utilize the resource by consuming 712 global resource allotment units from the second class global resource pool 706 (e.g., allow utilization 718). The resource allocation component 714 may allow the second class background task 722 to consume 712 global resource allotment units in 200 unit chunks (e.g., based upon a maximum value of 200 resource allotment units for the second class application resource pool 702).

Figure 8:
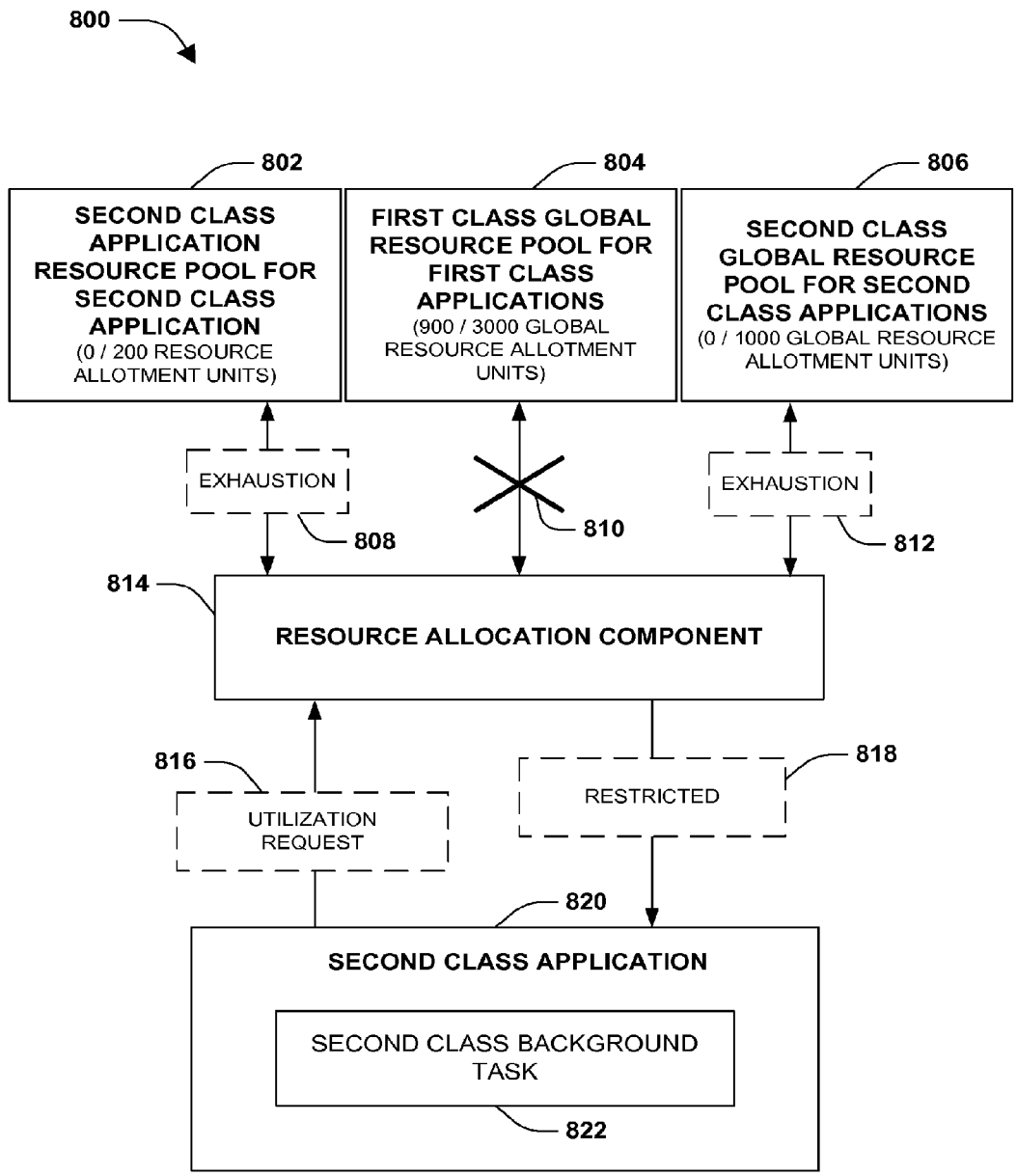
FIG. 8 is an illustration of an example of a second class background 822 of a second class application being restricted from utilizing a resource.

FIG. 8 illustrates an example 800 of a second class background task 822 of a second class application 820 being restricted 818 from utilizing a resource. A resource allocation component 814 may be configured to maintain a second class application resource pool 802 for the second class application 820. The resource allocation component 814 may be configured to maintain a first class global resource pool 804 for first class applications (e.g., one or more first class applications not illustrated). The resource allocation component 814 may be configured to maintain a second class global resource pool 806 for second class applications (e.g., second class application 820 and/or other second class applications not illustrated).

The second class background task 822 may attempt to utilize a resource (e.g., utilization request 816) by consuming resource allotment units from the second class application resource pool 802. However, the resource allocation component 814 may restrict the second class background task 822 from utilizing the resource via the second class application resource pool 802 because the second class application resource pool 802 is exhausted 808. In one example, the second class background task 822 may be restricted 810 from consuming global resource allotment units from the first class global resource pool 804 because the second class background task 822 is not a first class background task. Because the second class application resource pool 802 is exhausted 808, the resource allocation component 814 may allow the second class background task 822 to utilize the resource by consuming global resource allotment units from the second class global resource pool 806 (e.g., if global resource allotment units are available for consumption). However, the resource allocation component 814 may restrict 818 the second class background task 822 from utilizing the resource via the second class global resource pool 806 because the second class global resource pool 806 is exhausted 812. It may be appreciated that additional and/or alternative techniques may be implemented to improve foreground responsiveness, such as a decay usage CPU scheduling algorithm, for example. Such an algorithm may, for example, restrict a background task from continuously consuming available background CPU time. The algorithm may bias background task activity to be statistically less important than other activity executing by the system. For example, a background task may be restricted from preempting a user foreground activity and/or may be preempted by the user foreground activity.

Figure 9:
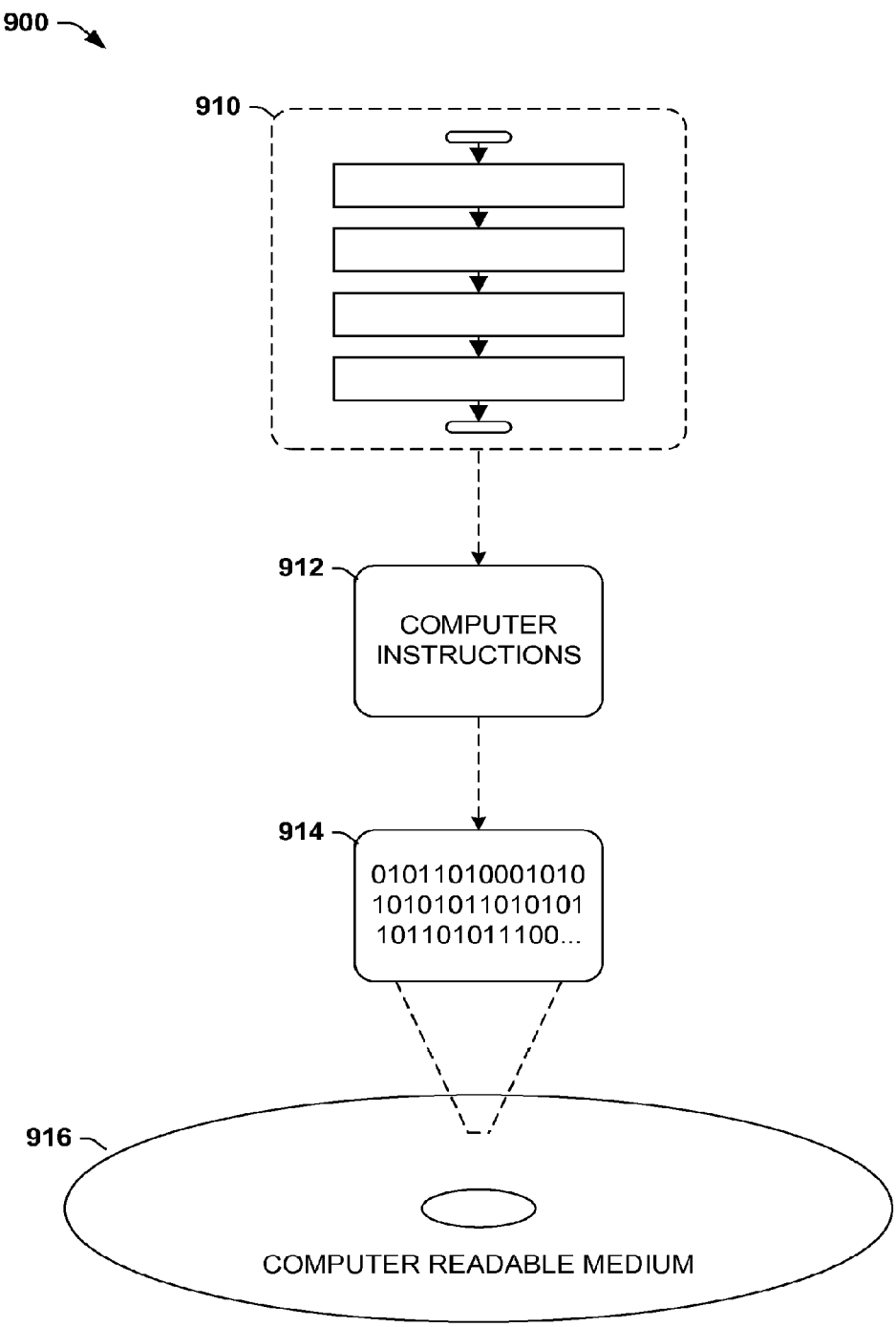
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 100 of FIG. 1, for example. In another such embodiment, the processor-executable instructions 912 may be configured to implement a system, such as at least some of the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
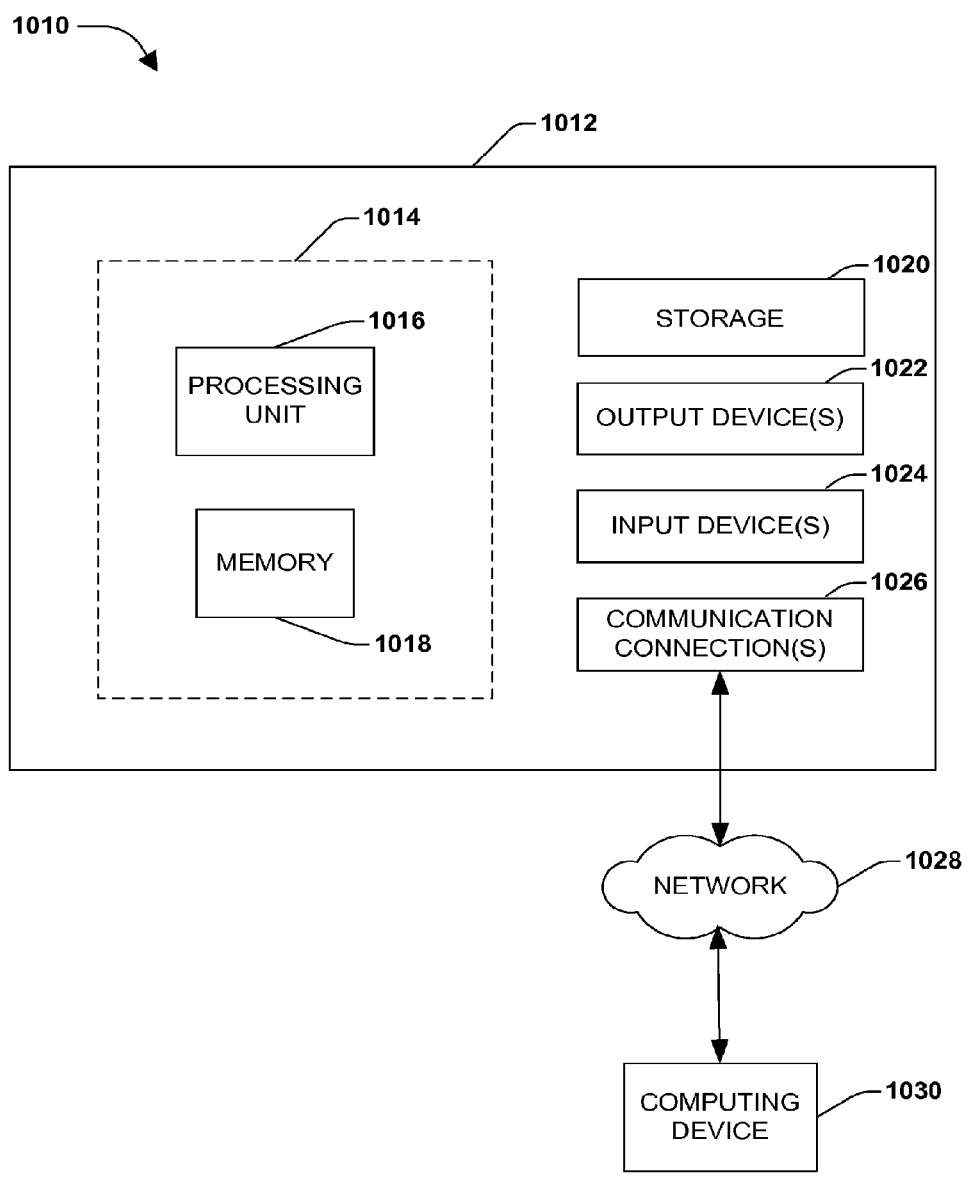
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computing system comprising:
    one or more processors;
    one or more hardware storage device having stored computer-executable instructions which are executable by the one or more processors for causing the computing system to:
        assign an application resource pool to an application with a predetermined quantity of available consumable resource units associated with a resource available to the computing system for consumption by one or more tasks of the application;
        determine that the assigned application resource pool is exhausted in response to determining that all of the available consumable resource units associated with the assigned application resource pool are consumed by the one or more tasks of the application and that there are no available consumable resource units remaining in the application resource pool; and
        restrict the one or more tasks of the application from utilizing the resource in response to determining that the assigned application resource pool is exhausted.

2. The computing system of claim 1, wherein the computer-executable instructions are further executable by the one or more processors for causing the computing system to:
    detect a replenishment event for triggering a replenishment of one or more new consumable resource units to the assigned application resource pool; and
    replenish the assigned application resource pool by allocating the one or more new available consumable resource units to the assigned application resource pool in response to the replenishment event.

3. The computing system of claim 2, wherein the replenishing event occurs subsequent to the assigned application resource pool becoming exhausted.

4. The computing system of claim 3, wherein the computer-executable instructions are further executable by the one or more processors for causing the computing system to remove restrictions placed on access to the resource by the one or more tasks of the application when the one or more new available consumable resource units become available in the assigned application resource pool.

5. The computing system of claim 2, wherein a predetermined replenishment quantity of the one or more new consumable resource units that are replenished to the assigned application resource pool is based on a device state of the computing system.

6. The computing system of claim 5, wherein the computer-executable instructions are further executable by the one or more processors for causing the computing system to:
    detect a change in the device state; and
    modify the predetermined replenishment quantity in response to the detected change in the device state.

7. The computing system of claim 6, wherein the device state is a power state.

8. The computing system of claim 2, wherein a predetermined replenishment quantity of the one or more new consumable resource units that are replenished to the assigned application resource pool is based on a type of the application, such that an association of a different type of the application to the assigned application resource pool will cause a correspondingly different predetermined replenishment quantity to be associated with the application resource pool.

9. The computing system of claim 1, wherein the replenishing event comprising a tolling of a predetermined period of time.

10. The computing system of claim 1, wherein the replenishing event comprises a change in a device state of the computing system.

11. The computing system of claim 10, wherein the change in the device state comprises a change in a power state.

12. The computing system of claim 1, wherein the predetermined quantity of available consumable resource units corresponds to an initial maximum size value of the assigned application resource pool and wherein the computer-executable instructions are further executable by the one or more processors for causing the computing system to:
   detect a change in the device state; and
   resize the initial maximum size value of the assigned application resource pool in response to the detected change in the device state.

13. The computing system of claim 12, wherein the initial maximum size value associated with the application resource pool is based on the device state of the computing system, such that a different device state of the computing system causes the assigned application resource pool to have a correspondingly different initial maximum size value.

14. The computing system of claim 13, wherein the device state is a power state.

15. The computing system of claim 12, wherein the initial maximum size value associated with the application resource pool is based on an application type, such that an association of a different application to the assigned application resource pool causes a correspondingly different initial maximum size value to be associated with the assigned application resource pool.

16. The computing system of claim 12, wherein the resizing includes reducing the maximum size value associated with the assigned application resource pool and a corresponding amount of available consumable resource units in the assigned application resource pool.

17. The computing system of claim 9, wherein the resizing includes increasing the initial maximum size value associated with the assigned application resource pool and a corresponding amount of available consumable resource units in the assigned application resource pool.

18. The computing system of claim 1, wherein the computer-executable instructions are further executable by the one or more processors for causing the computing system to:
   initiate a transfer of a predetermined quantity of other consumable resource units to the assigned application resource pool from a global resource pool that is associated with a predetermined maximum quantity of the other consumable resource units in response to detecting the assigned application resource pool is exhausted.

19. One or more hardware storage device having stored computer-executable instructions which are executable by one or more processors of a computing system to cause the computing system to:
   assign an application resource pool to an application, the assigned application resource pool having a predetermined quantity of available consumable resource units associated with a resource for consumption by one or more tasks of the application, wherein consumption of all the available consumable resource units by the one or more tasks of the application causes an exhaustion of the assigned application resource pool;
   determine that the assigned application resource pool is exhausted in response to all of the available consumable resource units associated with the assigned application resource pool being consumed and that there are no available consumable resource units remaining in the assigned application resource pool; and
   restrict the one or more tasks of the application from utilizing the resource in response to determining that the assigned application resource pool is exhausted.

20. A method implemented by a computing system for controlling resource access for background tasks, comprising:
   assigning an application resource pool to an application, the assigned application resource pool having a predetermined quantity of available consumable resource units associated with a resource for consumption by one or more tasks of the application, wherein consumption of all the available consumable resource units by the one or more tasks of the application causes an exhaustion of the assigned application resource pool;
   determining that the assigned application resource pool is exhausted in response to all of the available consumable resource units associated with the assigned application resource pool being consumed and that there are no available consumable resource units remaining in the assigned application resource pool; and
   restricting the one or more tasks of the application from utilizing the resource in response to determining that the assigned application resource pool is exhausted.

* * * * *